(12) United States Patent
Jintaseranee et al.

(10) Patent No.: US 9,462,418 B2
(45) Date of Patent: Oct. 4, 2016

(54) AUGMENTATION OF CALL DATA INFORMATION TO DETERMINE A LOCATION OF A WIRELESS COMMUNICATION DEVICE

(71) Applicant: Sprint Communications Company L.P., Overland Park, KS (US)

(72) Inventors: Kosol Jintaseranee, Millbrae, CA (US); Mark Evans, El Granada, CA (US); Hui Zang, Cupertino, CA (US); Sara Gatmir-Motahari, Redwood City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 338 days.

(21) Appl. No.: 13/899,069

(22) Filed: May 21, 2013

(65) Prior Publication Data

US 2014/0349670 A1 Nov. 27, 2014

(51) Int. Cl.
*H04W 4/02* (2009.01)
*H04W 64/00* (2009.01)

(52) U.S. Cl.
CPC ............. *H04W 4/025* (2013.01); *H04W 64/00* (2013.01)

(58) Field of Classification Search
CPC ..... H04W 64/00; H04W 4/02; H04W 24/08; H04W 24/04; H04W 52/0251; H04W 36/24; H04W 76/028; H04L 5/0073; G01S 5/145; G06K 9/00563; G06K 9/6212

USPC ................. 455/456.1, 422.1, 67.13, 77, 517; 370/252; 342/464

See application file for complete search history.

(56) References Cited

U.S. PATENT DOCUMENTS

| | | | |
|---|---|---|---|
| 6,782,261 B1 | 8/2004 | Ahmed et al. | |
| 8,107,430 B1* | 1/2012 | Sarkar et al. | 370/329 |
| 8,135,380 B1* | 3/2012 | Vargantwar | 455/404.2 |
| 8,165,599 B1 | 4/2012 | Dronamraju et al. | |
| 2001/0027114 A1 | 10/2001 | Kim | |
| 2004/0087340 A1* | 5/2004 | Cao et al. | 455/560 |
| 2006/0052114 A1* | 3/2006 | Cuffaro | 455/456.1 |
| 2010/0317390 A1* | 12/2010 | Rekimoto | 455/511 |
| 2011/0159891 A1 | 6/2011 | Segall et al. | |
| 2012/0063340 A1* | 3/2012 | Waters et al. | 370/252 |
| 2012/0201195 A1* | 8/2012 | Rausch et al. | 370/328 |
| 2013/0122927 A1* | 5/2013 | Hu | 455/456.1 |
| 2013/0288704 A1* | 10/2013 | Wirola et al. | 455/456.1 |

FOREIGN PATENT DOCUMENTS

| | | |
|---|---|---|
| EP | 0873662 | 5/1998 |
| EP | 1841256 | 10/2007 |

* cited by examiner

*Primary Examiner* — Phuoc H Doan

(57) ABSTRACT

Embodiments disclosed herein provide systems and methods for augmenting call data information to determine a location of a wireless communication device. In a particular embodiment, a method provides receiving wireless signals transmitted from a plurality of base stations and determining signal strengths for at least some of the wireless signals. The method further provides identifying at least three geographically diverse ones of the base stations having signal strengths that satisfy a location-determination strength threshold. The method further provides transmitting base station identifiers and associated signal strengths for the geographically diverse base stations.

18 Claims, 6 Drawing Sheets

ROUTE UPDATE MESSAGE

ACTIVE SET:
Serving Sector
- Pilot PN: S41
- Pilot Strength: -2db
Other Sectors
- Pilot Phase (PN: S43)
- Pilot Strength: -10db NON-ACTIVE SET:
Sector
- Pilot Phase (PN: S22)
- Pilot Strength: -15db
Sector
- Pilot Phase (PN: S33)
- Pilot Strength: -17db

AUGMENTATION OF CALL DATA INFORMATION TO DETERMINE A LOCATION OF A WIRELESS COMMUNICATION DEVICE

TECHNICAL BACKGROUND

Many methods exist for determining the location of a wireless communication device. One of those methods is performed predominantly by a wireless communication network. In particular, the wireless network may receive information from the wireless device that indicates with which wireless base station the wireless device is exchanging communications. The wireless network can then infer that the wireless device is located somewhere within the wireless coverage area of that base station.

The location determined using the information described above only provides the wireless network with a level of accuracy down to the nearest base station. Thus, it may be desirable for the wireless network to determine a more accurate location of the wireless device. Other methods exist in the wireless device, such as Global Positioning System (GPS) receivers, that are able to provide the wireless network with more accurate location information. However, these other methods typically must provide their determined location information to the wireless network in communications beyond the communications already exchanged with the wireless network when placing a call.

OVERVIEW

Embodiments disclosed herein provide systems and methods for augmenting call data information to determine a location of a wireless communication device. In a particular embodiment, a method provides receiving wireless signals transmitted from a plurality of base stations and determining signal strengths for at least some of the wireless signals. The method further provides identifying at least three geographically diverse ones of the base stations having signal strengths that satisfy a location-determination strength threshold. The method further provides transmitting base station identifiers and associated signal strengths for the geographically diverse base stations.

BRIEF DESCRIPTION OF THE DRAWINGS

FIG. 5 illustrates an exemplary route update message in the operation of the wireless communication system for augmenting call data information to determine a location of a wireless communication device.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
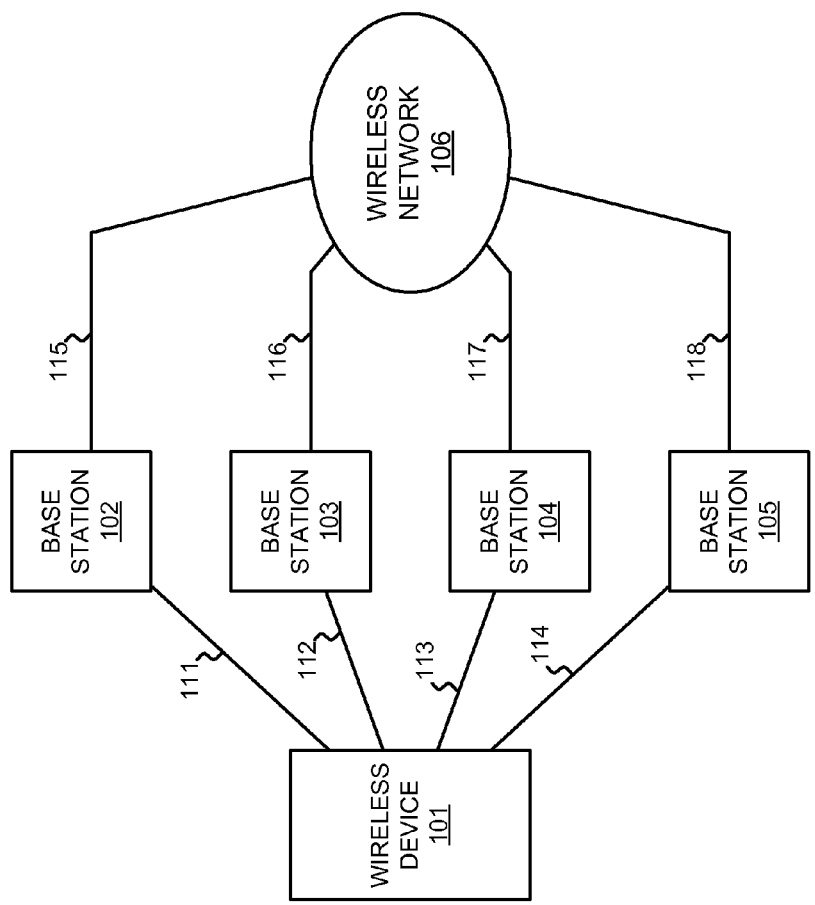
FIG. 1 illustrates a wireless communication system for augmenting call data information to determine a location of a wireless communication device.

FIG. 1 illustrates wireless communication system 100. Wireless communication system 100 includes wireless communication device 101, base stations 102-105, and wireless communication network 106. Wireless communication device 101 and base stations 102-105 communicate over wireless links 111-114, respectively. Base stations 102-105 and wireless communication network 106 communicate over communication links 115-118, respectively. The locations of elements 101-106 in FIG. 1 do not necessarily represent the relative locations of elements 101-106 in a geographic area.

In operation, wireless network 106 provides wireless communication services to wireless communication devices, including wireless device 101, via wireless base stations, including base stations 102-105. During the provision of the wireless communications services wireless network 106, or some other system associated with wireless network 106, wireless network 106 may determine and/or track locations of wireless devices. The location may be relevant to how the services are provided, how the services are billed, network statistical information, third party applications, or any other reason for knowing the location of a wireless device—including combinations thereof.

In some cases, a location of a wireless device may be identified to wireless network 106 based on a base station with which a wireless device is communicating. Wireless network 106 can then infer the location of the wireless device as being within a geographic area that is serviced by the identified base station. For example, a Reveal Location platform within wireless network 106 may receive Per Call Measurement Data (PCMD) from wireless device 101 that includes an active set for wireless device 101. The active set identifies a base station currently serving wireless device 101 and the Reveal Location platform infers the location of wireless device 101 from the identified base station. While, in some situations, a single base station level of granularity for the location of a wireless device may be sufficient, other situations may find more accurate device locations useful.

Figure 2:
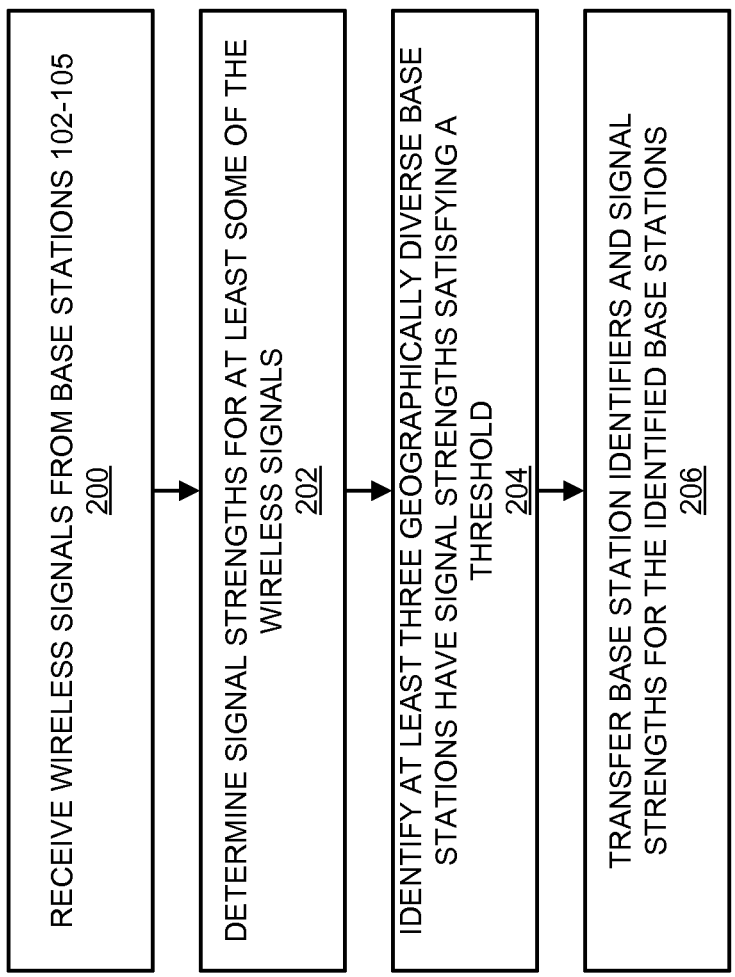
FIG. 2 illustrates an operation of the wireless communication system for augmenting call data information to determine a location of a wireless communication device.

FIG. 2 illustrates an operation of wireless communication system 100 for augmenting call data information to determine a location of a wireless communication device. Wireless device 101 receives wireless signals transmitted from base stations 102-105 and determines signal strengths for at least some of the wireless signals (step 200). The wireless signals may be pilot signals, control channels, traffic channels, or any other type of wireless signal that may be transmitted from a base station—including combinations thereof.

Wireless device 101 identifies at least three geographically diverse ones of base stations 102-105 having signal strengths that satisfy a location-determination strength threshold (step 202). Wireless device 101 may determine the geographic diversity of a base station by first determining a location of the base station. In some embodiments, each of base stations 102-105 may include its geographic coordinates. In alternative embodiments, wireless device 101 may maintain a data structure of base station coordinates and associated base station identifiers that allows wireless device 101 to look up a base station's location using the base station's identifier. In some embodiments, each of base stations 102-105 may broadcast coordinates of the other base stations in addition to their own coordinates. This functionality may be accomplished by including neighboring base station coordinates in a neighbor list transferred to wireless device 101. Other methods of determining a base station location may also be used.

Once the locations of base stations 102-105 are determined. Wireless device 101 processes the locations to determine the geographic diversity of base stations 102-105. Base stations 102-105 may be considered geographically diverse if they are located more than a certain distance from another base station, located more than certain distances from two or more other base stations, located more than a certain distance and a certain angle from a line including two other base stations with one of the other base stations being a vertex, or any other way that a device may determine that two locations are geographically diverse. In some embodiments, wireless device 101 may factor in a relative geometric shape formed if lines where drawn between the base station locations to determine whether the shape would be beneficial to location determination. For example, three base stations located substantially on the same line would be less useful for location determination than three base stations forming a triangle around wireless device 101.

The signal strengths of the wireless signals may be measured by wireless device 101 as part of the normal operation of wireless device 101. In particular, wireless device 101 measures signal strengths of wireless signals from various base stations in order to determine with which base station wireless device 101 should exchange wireless communications. However, instead of discarding signal strengths that fall below a threshold for communication exchanges, wireless device 101 further compares the signal strengths to the location-determination strength threshold to determine whether the signal strengths are sufficiently high to aid in location determination. The signal strengths and, in some embodiments, pilot phases measured by wireless device 101 for base stations with high enough signal strengths may then be used to estimate how far wireless device 101 is from each base station.

After identifying the geographically diverse base stations, wireless device 101 transmits base station identifiers and associated signal strengths for the geographically diverse base stations (step 204). The base station identifiers may comprise any type of identifier that uniquely identifies the base station to wireless network 106. In some embodiments, each of the base station identifiers may identify a particular wireless sector from which the wireless signal for that base station was transmitted (e.g. a unique PN code for the wireless sector). For example, the base station identifiers may include identifiers for base stations 102-104 because base station 105 was determined to either not be geographically diverse from one or more of base stations 102-104, the wireless signal from base station 105 may not have been above the location-determination strength threshold, or both.

In some embodiments, the base station identifiers are transferred along with an active set for wireless device 101. Likewise, one or more of the base station identifiers may be included in the active set. An active set indicates a wireless sector that is currently providing wireless device 101 with wireless communication services along with other wireless sectors that are candidates to provide wireless communication services upon wireless device 101 performing a soft handoff to one of those other sectors. In some embodiments, the active set and the base station identifiers are transferred in a route update message (possibly as part of PCMD), which may be transmitted to wireless network 106 upon initiation of a call between wireless network 106 and wireless device 101.

Wireless network 106 may use the base station identifiers to determine the location of wireless device 101. In particular, a location determination system, such as a Reveal Location platform, in wireless network 106, uses the information received from wireless device 101 to estimate the location of wireless device 101. Wireless network 106 may use the base station identifiers to determine the locations of the base stations associated with the base station identifiers by referencing a database of base station identifiers and associated locations or by some other means. The signal strengths from each of the base stations may then be used to estimate how far wireless device 101 is from each base station since wireless signal strengths tend to decrease as distance increases from the transmitter of the signal. The location of wireless device 101 may then be estimated as being near a geographic point where the estimated distance from each base station converges.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless base stations 102-105 each comprise RF communication circuitry and an antenna. The RF communication circuitry typically includes an amplifier, filter, RF modulator, and signal processing circuitry. Wireless base stations 102-105 each may also comprise a router, server, memory device, software, processing circuitry, cabling, power supply, network communication interface, structural support, or some other communication apparatus.

Wireless communication network 106 comprises network elements that provide communications services to wireless device 101 through base stations 102-105. Communication network 103 may comprise switches, wireless access nodes, Internet routers, network gateways, application servers, computer systems, communication links, or some other type of communication equipment—including combinations thereof.

Wireless links 111-114 use the air or space as the transport media. Wireless link 111-114 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112-118 use metal, glass, air, space, or some other material as the transport media. Communication links 112-118 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112-

118 could be a direct link or may include intermediate networks, systems, or devices.

Figure 3:
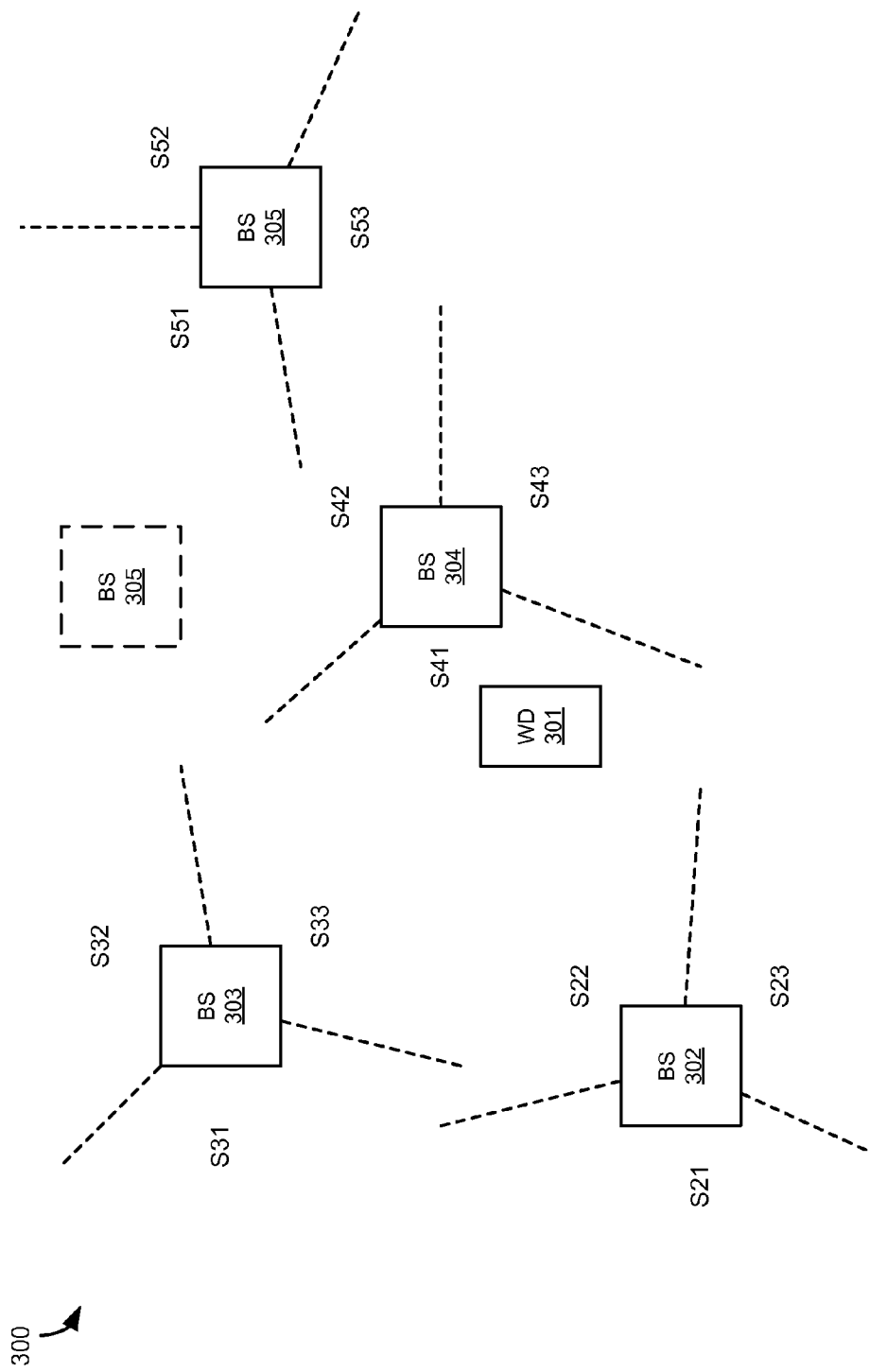
FIG. 3 illustrates a wireless communication system for augmenting call data information to determine a location of a wireless communication device.

FIG. 3 illustrates wireless communication system 300. Wireless communication system 300 includes wireless communication device 301 and base stations 302-305. Base stations 302-305 exchange wireless communications with wireless communication devices, including wireless device 301, within three wireless sectors S21-S23, S31-S33, S4-S43, and S51-S53, respectively. The locations of elements 301-305 in FIG. 3 reflect exemplary geographic locations of elements 301-305 relative to one another. Though not shown, base stations 302-305 are connected to a wireless network like wireless network 106 from FIG. 1. The wireless network includes a location determination system that determines a location of wireless device 301 based on pilot signals identified by wireless device 301, as described below.

Figure 4:
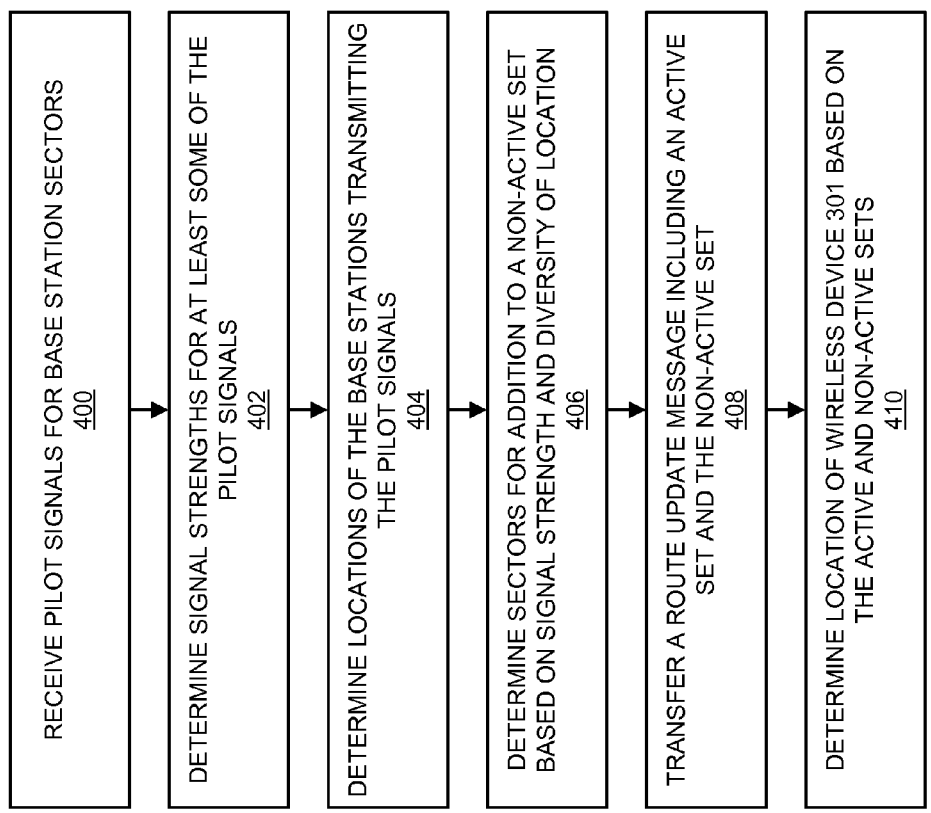
FIG. 4 illustrates an operation of the wireless communication system for augmenting call data information to determine a location of a wireless communication device.

FIG. 4 illustrates an operation of wireless communication system 300 for augmenting call data information to determine a location of a wireless communication device. Wireless device 301 receives pilot signals from wireless sectors of base stations 302-305 (step 400). A neighbor list received by wireless device 301 from the wireless network of base stations 302-305 may indicate frequencies for the pilot signals to wireless device 101. Wireless device 301 may be able to receive all of the pilot signals from all of the sectors shown in FIG. 3 or may only be able to receive a subset of the pilot signals due to signal propagation limitations for some wireless sectors relative to the location of wireless device 301.

Wireless device 301 determines signal strengths of at least some of the received pilot signals (step 402). The signal strengths may be determined as part of the normal operation of wireless device 301 when determining which wireless sectors should be included in the active set for wireless device 301 or may be determined as part of a separate operation. Wireless device 301 further determines a location of each base station transmitting the pilot signals for which signal strengths were determined (step 404). In this embodiment, the pilot signals include geographic coordinates for their respective base stations. Wireless device 301 thereby determines the base station locations from the coordinates in the received pilot signals.

Once the locations and signal strengths have been determined, wireless device 301 determines which sectors to include in a non-active set for location determination based on the signal strengths and base station locations (step 406). In particular, wireless device 301 determines whether the signal strength of the received pilot signals is greater than a threshold for location determination yet also below a threshold for placing the pilot signal in an active set for wireless device 301. If the signal strength is above the active set threshold, then the corresponding pilot signal is already placed in the active set and would not warrant being included in the non-active set. Each pilot signal for inclusion in the non-active set should be higher than the location determination threshold so that the signal strength is high enough to estimate distance from the transmitting base station.

In addition to the signal strengths meeting the thresholds described above, the locations of the base stations transmitting the pilot signals satisfying the above thresholds are processed to determine which of the signals are transferred by geographically diverse base stations. The locations of one or more base stations whose pilot signals are included in the active set are further considered when determining geographical diversity of base stations to be included in the non-active set. In other words, the geographic diversity of base stations is determined across all base stations for transmittal to the wireless network, regardless of the set in which the base stations are included.

Once the active and non-active sets have been determined, wireless device 301 transfers the two sets in a route update message to the location determination system of the wireless network (step 408). FIG. 5 illustrates an exemplary route update message 500 that may be transferred in the present embodiment. Route update message 500 may be transferred as part of PCMD. Route update message 500 includes both an active set and a non-active set determined during the steps described above. In particular, the active set identifies the wireless sector currently servicing wireless device 301 in the form of the Pseudo Noise (PN) code broadcast in the pilot signal for sector S41 of base station 304. The active set further identifies the pilot phase and PN code of wireless sector S43, which is a likely sector for handoff of wireless device 301 from sector S41. Additionally, the non-active set included in route update message 500 lists PN codes and pilot phases for wireless sectors S22 and S33 of base stations 302 and 303, respectively.

In this example, wireless device 301 determined to include sectors S22 and S33 in the non-active set based on the geographic diversity of base stations 302 and 303 when compared to base station 304, which is already included in the active set. Specifically, base stations 302 and 303 may be included in the non-active set based on the fact that, along with base station 304, base stations 302-304 form a geographically diverse triangle around wireless device 301. In some embodiments, additional sectors from base stations 302 and 303 may be included in the non-active set if their respective pilot signal strengths meet the thresholds discussed above. However, inclusion of these pilot signals in the non-active set may not be necessary since they are transmitted from a base station already included in the non-active set. In other words, the non-active set may only include a pilot signal having the greatest strength of all threshold qualified pilot signals received from any given geographically diverse base station.

While wireless device 301 may have received one or more pilot signals from base station 305, no pilot signals from base station 305 are included in the non-active set. Those pilot signals may not be included in the non-active set because their signal strengths did not exceed the location determination threshold, the location diversity of base station 305 relative to base stations 302-304 was not sufficient, or a combination of both factors. For example, even if the signal strength of the pilot signal for wireless sector S53 where great enough for inclusion in the non-active set, base station 305 is substantially located on a line along with base stations 302 and 304. Therefore, the location of base station 305 is effectively redundant to the location of base station 304 for the purposes of determining a location of wireless device 301 and is not included in the non-active set. If, however, base station 305 were located in the area represented by the dashed representation of base station 305, then base station 305 may be considered geographically diverse enough to provide relevant location information about wireless device 301 and sector S53 may accordingly be included in the non-active set.

Referring back to FIG. 4, in response to receiving the route update message from wireless device 301, the location determination system of the wireless network determines a location of wireless device 301 based on the information included in the active and non-active sets therein (step 410). Specifically, the location determination system determines the locations of base stations 302-303 indicated by the pilot signals of the active and non-active sets of route update message 500. Additionally, the location determination system uses the signal strengths and pilot phase measurements indicated for each of the pilot signals in route update message 500 to estimate a distance from each of base stations 302-303. The distance estimates may be determined from a data structure listing the typical distance from a base station a received power level would indicate for each possible transmit power level. For example, the location determination system may determine that the −2 db signal strength for the pilot signal of wireless sector S41 indicates that wireless device 301 is about one-half mile from base station 304. The location determination system is then able to determine a location for wireless device 301 as being the location where the estimated distances from each of base stations 302-304 converge. In some embodiments, the estimated distances may not all converge so the location determination system may use a best-fit approximation for the location of wireless device 301 based on the distances.

Advantageously, the location determination system can determine a location of wireless device 301 based on additional information (i.e. the non-active set) included in a route update message that would otherwise be provided to the wireless network anyway.

In some embodiments, a route update message is transferred each time wireless device 301 initiates a voice or data call over the wireless network. Thus, the location of wireless device 301 may be determined each time wireless device 301 initiates a call. Steps 400-406 described in FIG. 4 to generate the route update message may also not occur until the call is initiated or may occur continually/periodically so that the route update message is ready for transfer upon initiation of the call.

Figure 6:
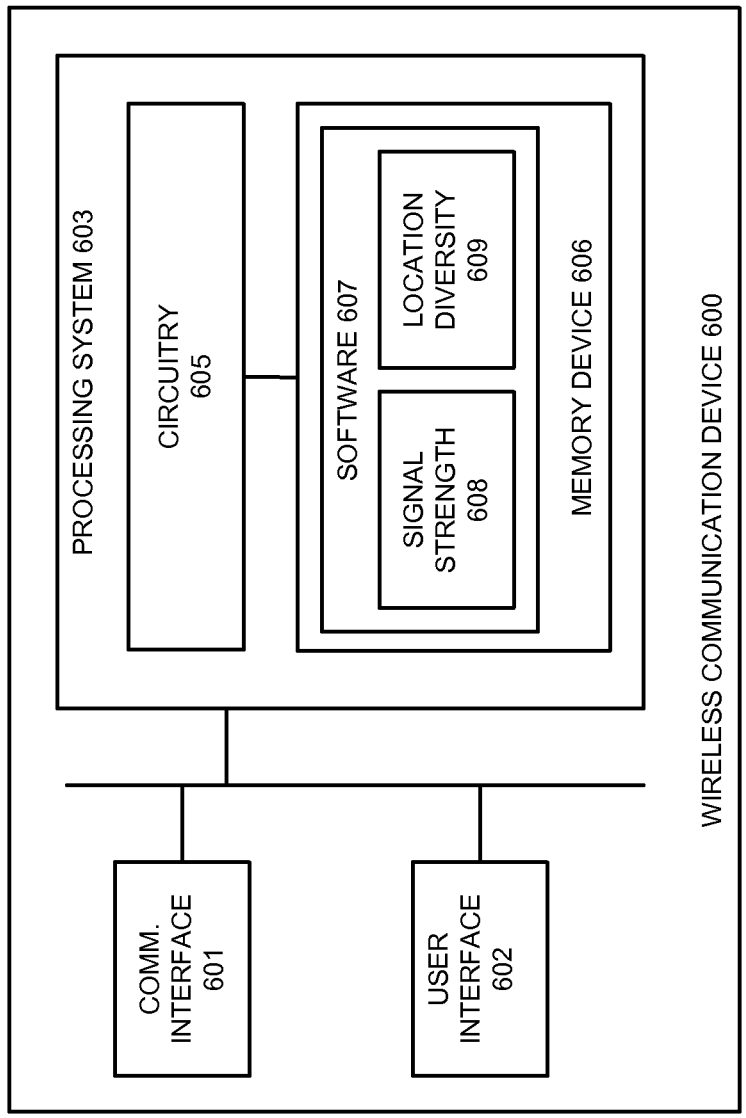
FIG. 6 illustrates a wireless communication device for augmenting call data information to determine a location of a wireless communication device.

FIG. 6 illustrates wireless communication device 600. Wireless communication device 600 is an example of wireless communication device 101, although device 101 could use alternative configurations. Wireless communication device 600 comprises wireless communication interface 601, user interface 602, and processing system 603. Processing system 603 is linked to wireless communication interface 601 and user interface 602. Processing system 603 includes processing circuitry 605 and memory device 606 that stores operating software 607. Wireless communication device 600 may include other well-known components such as a battery and enclosure that are not shown for clarity. Wireless communication device 600 may be a telephone, computer, e-book, mobile Internet appliance, media player, game console, wireless network interface card, or some other wireless communication apparatus—including combinations thereof.

Wireless communication interface 601 comprises RF communication circuitry and an antenna. The RF communication circuitry typically includes an amplifier, filter, RF modulator, and signal processing circuitry. Wireless communication interface 601 may also include a memory device, software, processing circuitry, or some other communication device. Wireless communication interface 601 may use various protocols, such as CDMA, EVDO, WIMAX, GSM, LTE, WIFI, HSPA, or some other wireless communication format.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes signal strength module 608 and location diversity module 609. Operating software 607 may further include an operating system, utilities, drivers, network interfaces, applications, or some other type of software. When executed by processing circuitry 605, operating software 607 directs processing system 603 to operate wireless communication device 600 as described herein.

In particular, signal strength module 608 directs processing system 603 to receive, via communication interface 601, wireless signals transmitted from a plurality of base stations and determine signal strengths for at least some of the wireless signals. Location diversity module 609 directs processing system 603 to identify at least three geographically diverse ones of the base stations having signal strengths that satisfy a location-determination strength threshold and transmit base station identifiers and associated signal strengths for the geographically diverse base stations via communication interface 601.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, comprising:
   receiving wireless signals transmitted from a plurality of base stations and determining signal strengths for at least some of the wireless signals;
   identifying at least three geographically diverse ones of the base stations having signal strengths that satisfy a location-determination strength threshold, wherein a signal strength of the signal strengths satisfies the location-determination strength threshold when the signal strength is greater than a threshold signal strength value and less than a signal strength value that would otherwise place a corresponding base station identifier in an active set for the wireless communication device; and
   transmitting base station identifiers and associated signal strengths for the geographically diverse base stations.

2. The method of claim 1, further comprising:
   receiving the base station identifiers from the wireless communication device and determining a location of the wireless communication device based on the base station identifiers.

3. The method of claim 2, further comprising receiving the associated signal strengths from the wireless communication device and determining the location of the wireless communication device based on the associated signal strengths.

4. The method of claim 1, wherein transmitting the base station identifiers comprises:
 transmitting the base station identifiers in a route update message.

5. The method of claim 1, wherein the base station identifiers comprise wireless sector identifiers.

6. The method of claim 1, wherein at least one base station identifier of the base station identifiers is transmitted in an active set for the wireless communication device.

7. The method of claim 6, wherein the base station identifiers other than the at least one base station identifier are transmitted as a non-active set along with the active set.

8. The method of claim 1, wherein identifying at least three geographically diverse ones of the base stations comprises:
 receiving a location of each base station of the plurality of base stations; and
 comparing the locations to determine geographic diversity between the base stations.

9. The method of claim 1, further comprising:
 initiating a call with the wireless communication device; and
 wherein transmitting the base station identifiers occurs in response to initiating the call.

10. A wireless communication device, comprising:
 a communication interface configured to receive wireless signals transmitted from a plurality of base stations;
 a processing system configured to determine signal strengths for at least some of the wireless signals and identify at least three geographically diverse ones of the base stations having signal strengths that satisfy a location-determination strength threshold, wherein a signal strength of the signal strengths satisfies the location-determination strength threshold when the signal strength is greater than a threshold signal strength value and less than a signal strength value that would otherwise place a corresponding base station identifier in an active set for the wireless communication device; and
 the communication interface further configured to transmit base station identifiers and associated signal strengths for the geographically diverse base stations.

11. The wireless communication device of claim 10, wherein a location system receives the base station identifiers from the wireless communication device and determines a location of the wireless communication device based on the base station identifiers.

12. The wireless communication device of claim 11, wherein the location system receives the associated signal strengths from the wireless communication device and determines the location of the wireless communication device based on the associated signal strengths.

13. The wireless communication device of claim 10, wherein to transmit the base station identifiers, the communication interface is configured to:
 transmit the base station identifiers in a route update message.

14. The wireless communication device of claim 10, wherein the base station identifiers comprise wireless sector identifiers.

15. The wireless communication device of claim 10, wherein at least one base station identifier of the base station identifiers is transmitted in an active set for the wireless communication device.

16. The wireless communication device of claim 15, wherein the base station identifiers other than the at least one base station identifier are transmitted as a non-active set along with the active set.

17. The wireless communication device of claim 10, wherein to identify at least three geographically diverse ones of the base stations, the processing system is configured to:
 receive a location of each base station of the plurality of base stations via the communication interface; and
 compare the locations to determine geographic diversity between the base stations.

18. The wireless communication device of claim 10, further comprising:
 the communication interface configured to initiate a call with the wireless communication device and transmit the base station identifiers occurs in response to initiating the call.

* * * * *